W. C. KRESS.
PNEUMATIC TRANSMISSION FOR AUTOMOBILES.
APPLICATION FILED SEPT. 18, 1919.
1,349,161.
Patented Aug. 10, 1920.
2 SHEETS—SHEET 1.
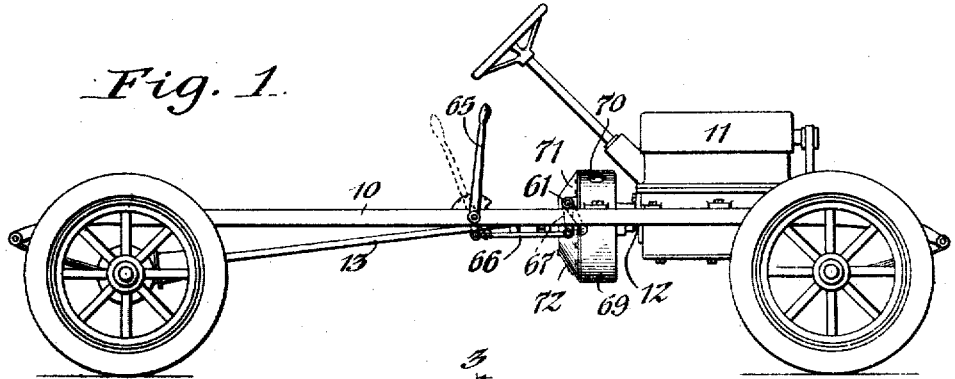
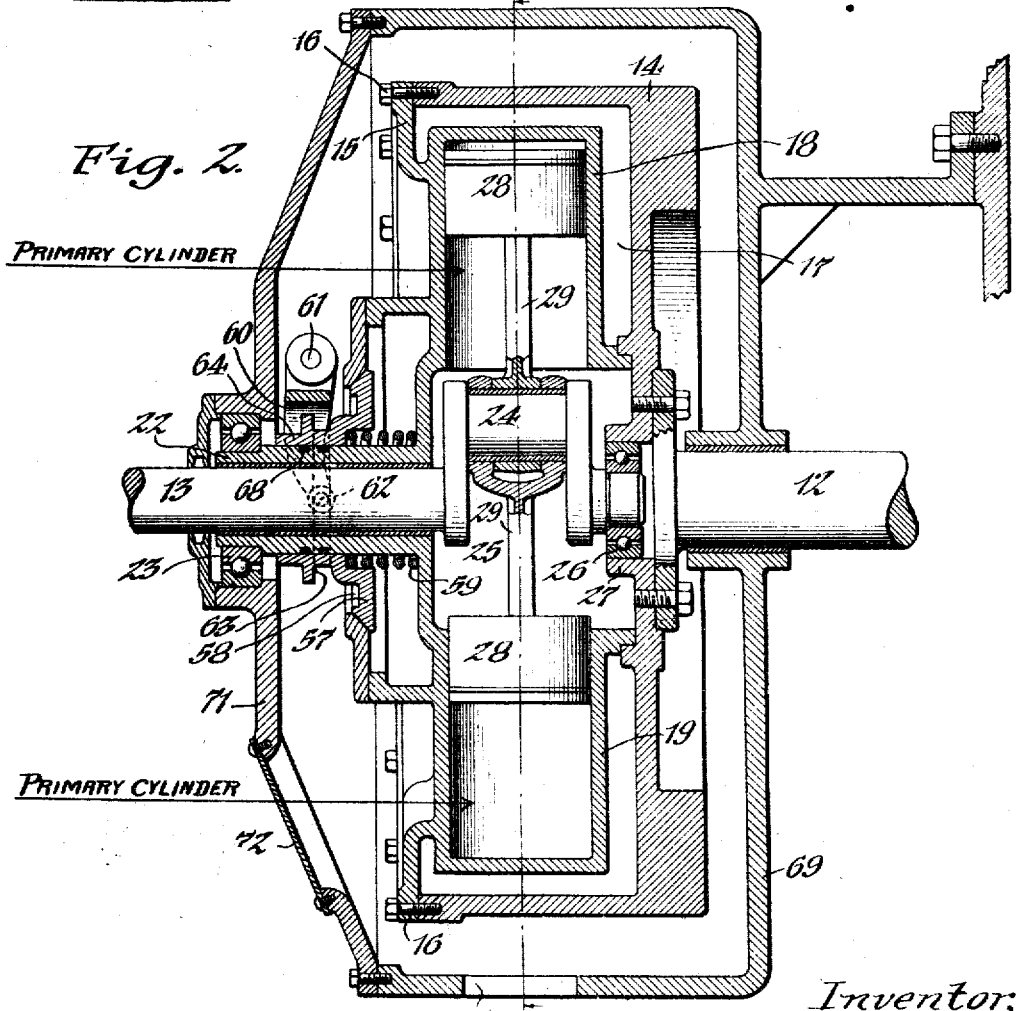
Inventor;
Willard C. Kress,
by Geyer Popp
Attorneys.

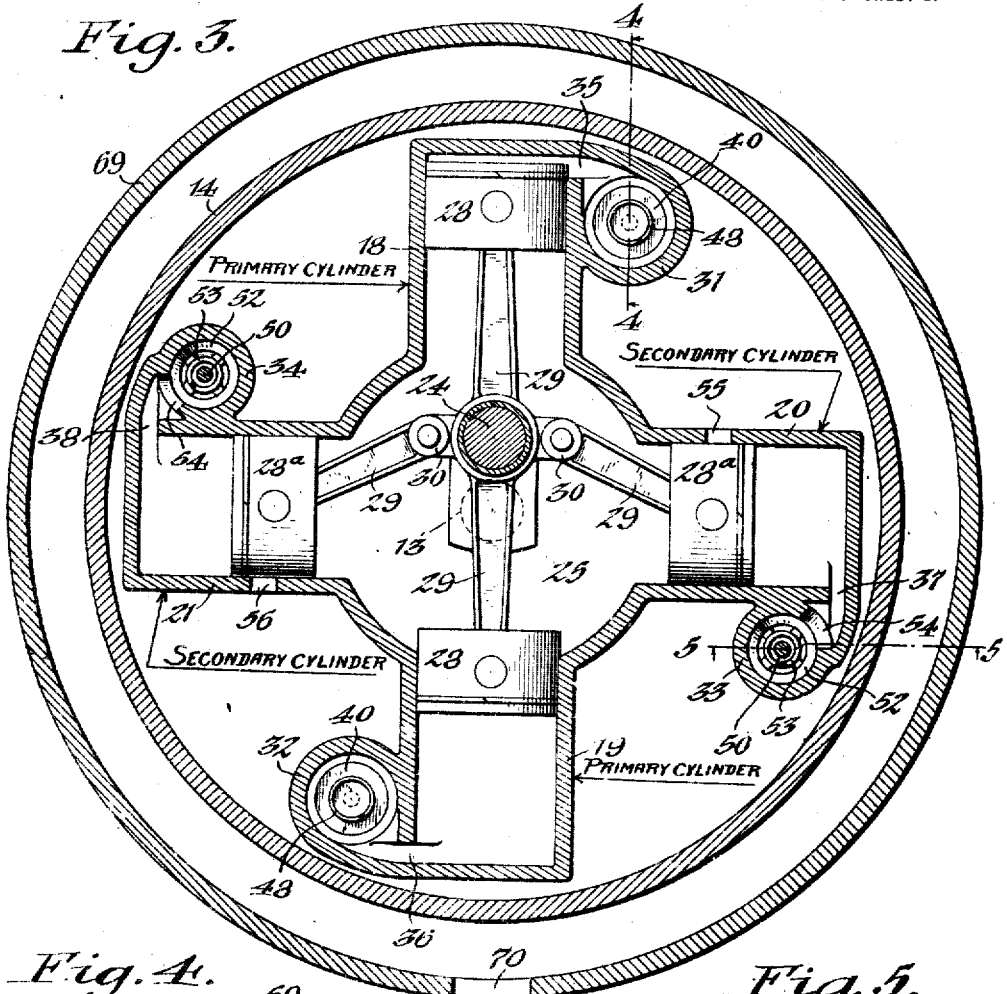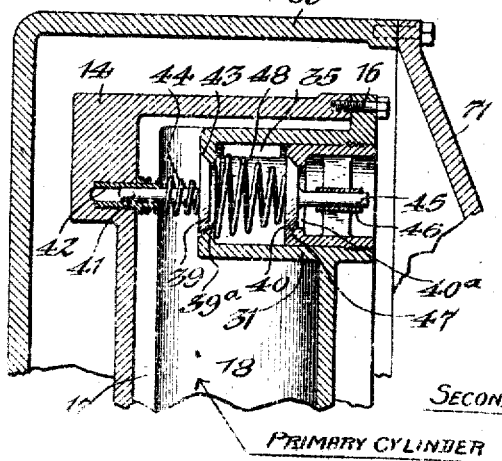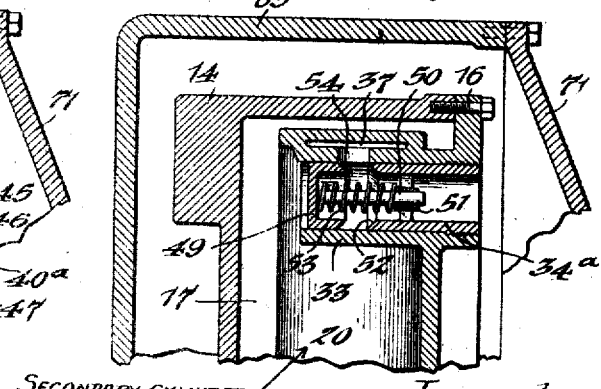

UNITED STATES PATENT OFFICE.

WILLARD C. KRESS, OF BUFFALO, NEW YORK.

PNEUMATIC TRANSMISSION FOR AUTOMOBILES.

1,349,161.  Specification of Letters Patent.  Patented Aug. 10, 1920.

Application filed September 18, 1919. Serial No. 324,544.

*To all whom it may concern:*

Be it known that I, WILLARD C. KRESS, a citizen of the United States, residing at Buffalo, in the county of Erie and State of New York, have invented new and useful Improvements in Pneumatic Transmissions for Automobiles, of which the following is a specification.

This invention relates to a pneumatic transmission mechanism, particularly for motor vehicles, which is designed to replace the usual friction clutch and change speed gears now commonly employed in automobile practice. In such transmissions as hitherto constructed, a number of air pumps or cylinders are connected with a driving member to revolve therewith and the pistons are connected with a crank of the driven member, so that the pistons, by the revolution about the relatively and temporarily stationary crank, are reciprocated and caused to produce an air cushion of gradually increasing tension which finally overcomes the inertia or resistance of the crank and the load of the vehicle and transmits the power of the engine to the traction wheels, either as a direct or high speed drive or at reduced speed of greater or less ratio according to the tension at which the controllable air cushion is maintained.

The chief object of the invention is to provide an elastic-drive-mechanism of this character which effects a rapid and prompt building up of the transmission cushion and which produces this result by a comparatively simple construction free from parts liable to get out of order.

Another object is to improve the controlling means of the transmission mechanism with a view of rendering it convenient and reliable in operation.

In the accompanying drawings:

Figure 1 is a side elevation of an automobile frame showing my improved transmission mechanism applied thereto. Fig. 2 is an enlarged sectional elevation of the transmission mechanism. Fig. 3 is a vertical transverse section on line 3—3, Fig. 2. Fig. 4 is a longitudinal section on line 4—4, Fig. 3, showing one of the valve mechanisms. Fig. 5 is a similar section on line 5—5, Fig. 3.

Similar characters of reference indicate corresponding parts throughout the several views.

10 indicates the frame of an automobile, 11 the engine 12 the driving or engine shaft and 13 the driven or propelling shaft suitably geared to the rear axle of the vehicle. Arranged between the engine shaft 12 and the driven shaft 13 is my improved transmission mechanism, which preferably includes the fly wheel 14, bolted to the engine shaft 12 in the usual manner. This wheel is hollow or chambered and closed at its rear end by a head or plate 15 fastened to the fly wheel by bolts 16, or other means, to form an air-tight pressure chamber 17. Carried by this head and preferably formed integral therewith, are a plurality of radially disposed pump-cylinders 18, 19, 20 and 21, the outer ends of which are closed. In the example shown in the drawings, four equidistant cylinders are employed, but it is to be understood that any other suitable number may be used. The fly wheel and said cylinders revolve as a unit about the axis of the driving shaft 12 of the engine.

Surrounding the fly-wheel unit is a housing 69, which is suitably fastened to the crank case of the engine or other adjacent part of the vehicle, and which is provided with one or more openings 70 for the admission of atmosphere to the pressure chamber 17 and said cylinders. The rear end of this housing is provided with a cover 71 bolted thereto and one or more cover plates 72 which are adapted to be removed to allow access to the working parts.

The driven shaft 13 is journaled at its forward end in a comparatively long hub 22 carried by the head 15, said hub being supported by a bearing 23 mounted centrally in the housing-cover 71. The axis of the shaft 13 is in alinement with the axis of the engine shaft 12 and carries at its front end, a crank 24 or equivalent eccentric element arranged to revolve in a chamber 25 with which the open inner ends of the cylinders communicate. The front end of the crank shaft 12¹, journaled in a bearing 26 located in the front hub 27 of the fly-wheel. Arranged in the respective cylinders are pistons 28 and 28ª operated by means of rods 29 connected at their inner ends to the crank 24. The connecting rods of the pistons operating in cylinders 20 and 21 are preferably connected to lugs or extensions 30 arranged on the strap of the connecting rod of the piston operating in the cylinder 18. By this construction, a saving of space is effected as well as a corresponding reduction of weight.

A number of the cylinders, say the cylinders 18, 19 are primary or low pressure pumps which take in air at atmospheric pressure and deliver it into the pressure chamber, producing an initial pressure therein above that of the atmosphere, while the remaining cylinders 20, 21 are secondary or high pressure cylinders which are supplied from said pressure-chamber and in which the partly compressed air is further compressed to the proper degree to turn the crank 24 and transmit motion from the driving to the driven shaft at a greater or less speed.

For this purpose, the two sets of cylinders are provided with a suitable valve mechanism which may be constructed as follows:

At or near the outer ends of the cylinders and preferably integral therewith are valve chambers 31, 32, 33 and 34, which communicate with the respective cylinders through passages 35, 36, 37, 38 arranged in the adjacent walls thereof.

Each of the valve chambers 31 and 32 of the low pressure cylinders 18 and 19 is provided with a pair of oppositely arranged valves 39 and 40 which reciprocate in a plane at right angles to the plane of operation of the pistons and are controlled by air pressure produced in the cylinders by their pistons. The valve 39 is provided with a stem 41 movable in a guide 42 and normally held against its seat 43 by a spring 44. The valve 40 is provided with a stem 45 movable in a guide 46 and normally held against its seat 47 by a spring 48. As clearly shown in Fig. 4, the port 39ª controlled by the valve 39 communicates with the air chamber 17, while the port 40ª controlled by the valve 40 communicates with the atmosphere through the housing 69 and opening 70. The companion valves 39 and 40 are so arranged that on the inward stroke of the corresponding piston the valve 40 is opened and the valve 39 closed, drawing air at atmospheric pressure into the cylinder, while upon the forward stroke of the piston, the action of said valves is reversed, expelling the charge of air into the pressure chamber 17 through the port 39ª.

Each of the valve chambers 33 and 34 of the high pressure or resistance cylinders 20 and 21, is provided with a pressure controlled valve 49, preferably in the form of a piston and having a stem 50 movable in a guide 51, and normally held away from its seat 52 by a spring 53 surrounding said stem. The spring 53 may be very light since it need only be capable of overcoming the inertia of the valve 49 and its frictional contact with the surrounding valve chamber and holding said valve away from its seat 52 when other forces do not act upon it. In its normal or open position, this valve uncovers a port 54 in the adjacent wall of the valve chamber which communicates with the respective cylinder through the passage 37 or 38. The valve chambers 33 and 34 open at one end into the pressure chamber 17, and communicate at their opposite ends with the atmosphere through the passage or valve-gage 34ª, the housing 69 and opening 70. The head of each piston valve 49 is thus exposed to the pressure in the chamber 17, and when a slight pressure is produced therein, as hereinafter more fully described, the valve 49 is closed against its seat 52, by said pressure thereby at the same time covering the port 54 and preventing the further escape of air from the cylinders into the atmosphere through said port and the passage 34ª. When the pressure in the chamber 17 is low and incapable of holding the valve 49 to its seat 52 against the slight resistance of the spring 53, said valve is moved from said seat by said spring, uncovering the port 54 and relieving the compression in the cylinders by permitting escape of the air to the atmosphere, as before described.

Extending through the cylinder walls 20 and 21 are air inlet ports 55 and 56, respectively, which communicate with the air chamber 17 and are so located with reference to the pistons, that when the latter reach the end of their inward stroke said ports are uncovered, while during the intermediate and final portions of the effective piston-strokes, said ports are covered.

In order to regulate the pressure in the chamber 17 for producing any desired speed of rotation of the driven propelling shaft, and for retaining the same neutral with reference to the driving or engine shaft, a control valve 57 is employed which is preferably arranged for sliding movement lengthwise on the hub of the casing 15. This valve is adapted to control an air outlet port 58 in the head 15 which communicates with the chamber 17 and permits the escape of air therefrom and the reduction of pressure therein when the valve is opened, while preventing its exit when the valve is closed under the pressure of a spring 59. This valve may be so actuated by a forked arm 60 mounted on a rock shaft 61 journaled in the adjacent housing 69, the arms of said fork being provided with the customary pins 62 which engage an annular groove 63 in the tubular extension 64 of the valve. This valve actuating fork may be operated from the seat of the automobile, by a control lever 65 connected with the rock shaft 61 by a link 66 and rock arm 67, fixed on the outer end of said rock shaft. To insure a tight joint where the valve slides on the hub of the casing 15, packing rings 68 are provided on the extension 64.

The operation of the transmission mechanism is as follows:

Assuming the car to be at a standstill and the engine started, with the control valve fully open to permit the engine to idle, the fly-wheel unit carrying the several cylinders revolves with the driving shaft 12 while the crank 24 and the propelling shaft 13 remain stationary causing the several pistons to reciprocate freely in their cylinders. On their backward stroke, the pistons 28 of the primary cylinders 18 and 19 draw in air under atmospheric pressure through the port 40ª, and on their forward stroke said pistons expel the air through the port 39ª into the pressure chamber 17 and thence freely into the atmosphere through the control port 58, allowing the pressure in said chamber to remain at that of the atmosphere. Therefore, the pressure controlled valves 49 in the valve chambers 33 and 34 remain open under the tension of their springs, since there is no pressure in the chamber 17 acting on them. It follows that during this operation, the pistons of the resistance-cylinders 20 and 21 idly take in and expel air alternately. These pistons 28ª, 28ª, upon reaching the inner end of their stroke, permit their cylinders to become filled with air, at substantially the same pressure as that in the air chamber 17 through the cylinder ports 55 and 56. This pressure is only atmospheric under these conditions and on their forward or outward stroke, these pistons cover said cylinder ports and the air in front of them is expelled through the open valves 49 and cages 34ª into the atmosphere. It is evident that were it not for the above-described action of the valves 49, there would still be considerable compression in said cylinders and consequent driving effect.

When it is desired to start the vehicle in motion, the operator moves the hand lever 65 in the proper direction to close the control valve 57, rendering the chamber 17 air tight. Under these conditions, the pistons operating in cylinders 18 and 19 pump air into this pressure chamber, and build up pressure therein. A certain amount of this compressed air will enter the resistance cylinders 20 and 21, every time their pistons reach the inner end of their stroke and uncover the ports 55 and 56, and will be exhausted through the port 54 and passage 34ª to the atmosphere; but owing to the short period during which the ports 55 and 56 are uncovered, only a portion of the air pumped by the primary cylinders 20 and 21 will escape in this way, and the faster the pistons reciprocate, the faster the air is pumped and the shorter is the period during which said ports 55 and 56 are uncovered and air is allowed to escape. Sufficient pressure is thus readily built up to close the valves 49 against the slight resistance of the springs 53, thereby covering the ports 54 and preventing further escape of the air from the cylinders 20 and 21. Hence, when the cylinder ports 55 and 56 of the last-named cylinders are uncovered during the inward stroke of the pistons, the cylinders will be filled with air under substantially the same pressure as that in the chamber 17. As the pistons advance and cover said ports, the air confined therein is further compressed to a very small volume. This offers considerable resistance to the movement of the pistons without however completely blocking them, with the result that a drag or re-action is exerted upon the crank 24 of the driven shaft 13, turning the latter and starting the vehicle. After thus compressing the air in the cylinders 20 and 21, the corresponding pistons permit it to expand again on their return stroke, until the pumping pistons operating in the primary cylinders 18 and 19, have created sufficient pressure in the air chamber 17 and in the cylinders 20 and 21, through their ports 55, 56, to prevent further forward movement of the pistons of the last-named cylinders. The crank 24 of the driven shaft 13 will then be compelled to rotate at the same speed as the engine shaft 12 or the equivalent of a direct drive. The speed may be regulated accordingly by opening the air control valve 57 to a greater or less degree to modify the pressure in the air chamber, different speeds from neutral to maximum or direct drive being obtainable. When it is desired to arrest the propelling shaft to stop the vehicle, the air control valve 57 is fully opened by moving the control lever to the dotted position shown in Fig. 1. This permits the pressure in the chamber 17 to fall to atmospheric pressure, thus relieving or removing the pressure which has been acting on the heads of the valves 49, allowing them to be opened by the springs 53 and relieving such compression as would otherwise remain in the cylinder. Hence it is evident that the valves 49 afford the advantage of eliminating practically all driving effect in the resistance cylinders 20, 21, when the pressure in the chamber 17 is at or very near to atmospheric pressure, thus leaving the motor free to rotate without exerting appreciable drag on the rear wheels of the vehicle. However, in cases where such a drag is not detrimental or objectionable, said valves 49 and the coöperating ports 54 and 34ª could be dispensed with, if desired.

By this improved pneumatic transmission mechanism, the pressure encountered by the pistons is not limited to the compression of a volume of air at atmospheric pressure with consequent limited driving effect, but the air which is compressed in the secondary or high pressure cylinders has an initial pressure which can be readily built up by the primary or low pressure cylinders and pistons to any required degree.

The apparatus, moreover, effects automatic acceleration of the vehicle speed. When the control valve 57 is closed by the operator, the car will start in motion and its speed will be accelerated to maximum or the equivalent of a direct and positive drive without further attention, inasmuch as the primary air pumps 18, 19, constantly increase the pressure against which the pistons of the secondary cylinders operate, until the resistance becomes sufficient to block the reciprocation of the pistons and interpose a practically direct power transmitting element between the driving and driven shafts.

While I have shown my improvement applied to a motor vehicle, it is to be understood that it is applicable to other similar uses where it is desired to transmit power at variable speeds from a driving member to a driven member.

I claim as my invention:

1. In a transmission mechanism, the combination with a driving shaft and a driven shaft, of a resistance-cylinder revoluble with the driving shaft and having a piston therein, a crank carried by said driven shaft and connected to said piston, a pneumatic pressure chamber adapted to communicate with said cylinder, means for creating pressure in said chamber, and means for controlling communication between said cylinder and said chamber.

2. In a transmission mechanism, the combination with a driving shaft and a driven shaft having an eccentrically-arranged member, of an air chamber, a primary cylinder and piston for delivering air into said chamber, and a secondary cylinder containing a piston and having an air inlet communicating with said chamber, said pistons being connected with said eccentrically-arranged member and the cylinders and pistons being revoluble with said driving shaft.

3. In a transmission mechanism, the combination with a driving shaft and a driven shaft having an eccentrically-arranged member, of an air chamber, a primary cylinder and piston for delivering air into said chamber, a secondary cylinder containing a piston and having an air inlet communicating with said chamber and controlled by the companion piston and an air outlet leading to the atmosphere, and a normally-open check valve controlling said outlet and exposed to the pressure in said air chamber.

4. In a transmission mechanism, the combination with a driving shaft and a driven shaft having an eccentrically-arranged member, of an air chamber, a primary cylinder and piston for delivering air into said chamber, a secondary cylinder containing a piston and having an air inlet communicating with said chamber, said pistons being connected with said eccentrically-arranged member and the cylinders and pistons being revoluble with said driving shaft, and means for regulating the air pressure in said chamber.

5. In a transmission mechanism, the combination with a driving shaft and a driven shaft having an eccentrically-arranged member, of a pneumatic pressure-chamber, a primary cylinder and piston arranged in said chamber for delivering air thereto, and a secondary cylinder also arranged in said chamber and containing a piston, said secondary cylinder having an air inlet communicating with said pressure chamber, said pistons being connected with said eccentrically-arranged member and the pressure chamber and the cylinders and pistons being revoluble with said driving shaft and means for regulating the air pressure in said chamber.

6. In a transmission mechanism, the combination with a driving shaft and a driven shaft, of two sets of cylinders revoluble with the driving shaft and having pistons therein, a crank carried by said driven shaft and connected to said pistons, a pneumatic pressure-chamber having a pressure outlet, a regulating valve for controlling said outlet, one set of said cylinders having atmospheric inlets and pressure outlets leading into said chamber, valves controlling said inlets and outlets, the other set of cylinders having inlets connected with said chamber and outlets leading to the atmosphere, and automatic valves applied to said last-named outlets for controlling the escape of the air from the last-named cylinders.

7. In a transmission mechanism, the combination with a driving shaft and a driven shaft, of a hollow wheel rotatable with one of said shafts and forming a pneumatic pressure chamber, oppositely-disposed cylinders arranged in said wheel and carried thereby, a crank carried by the other of said shafts, an air pumping piston operable in one of said cylinders and a pressure-control piston operable in the other of said cylinders, both of said pistons being connected with said crank, said pumping cylinder having valve mechanism for controlling the admission of air thereto and expelling it into said pressure chamber, the other cylinder being provided with an inlet port connected with said chamber and controlled by the corresponding piston and with an outlet port leading to the atmosphere, and a check valve applied to the last-named port and closed by the pressure in said wheel-chamber to impede the movement of its piston, said pressure chamber having a pressure outlet, and a regulating valve applied to the last-named outlet and controlled by the operator.

WILLARD C. KRESS.